July 23, 1935.  A. C. CHAMBERS  2,009,106

BRAKE

Filed Oct. 16, 1930

INVENTOR.
ALLEN C. CHAMBERS
BY
N. W. McConkey
ATTORNEY

Patented July 23, 1935

2,009,106

UNITED STATES PATENT OFFICE 2,009,106

BRAKE

Allen C. Chambers, South Bend, Ind., assignor to Bendix Brake Company, South Bend, Ind., a corporation of Illinois Application October 16, 1930, Serial No. 489,044

14 Claims. (Cl. 188—78)

This invention relates to brakes and is illustrated as embodied in an internal expanding brake for an automobile. An object of the invention is to provide a novel anchorage for the brake which will be actuated by the torque of the brake to intensify the brake applying force, that is, to give a self-energizing effect.

Preferably this novel anchorge is arranged to be operated by the torque of the brake to force radially against the rotating brake drum two parts of the brake friction means which are spaced some distance apart so that a considerable area of the friction means will be forced against the drum with great power by force derived from the braking torque. In one arrangement which is illustrated in the drawing, the brake friction device anchors on a leverage means which has two parts engaging portions of the friction device on opposite sides of the anchorage and which are operated by the torque of the brake to force the corresponding parts of the friction device radially against the drum. I prefer to use two leverage devices in the brake anchorage, one of which is effective when the drum is turning in one direction and the other of which is effective when the drum is turning in the opposite direction.

Various other objects and features of the invention, including novel and desirable structural details, will be apparent from the following description of the illustrative embodiment shown in the accompanying drawing, in which.

Figure 1:
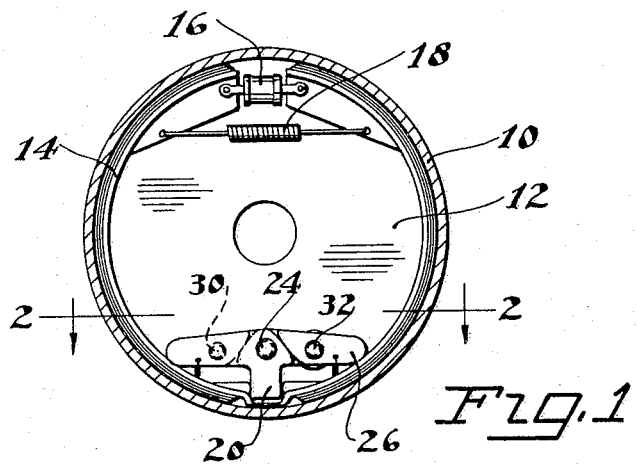
Figure 1 is a vertical section through the brake just inside the head of the brake drum and showing the novel brake friction means in side elevation.
Figure 2:
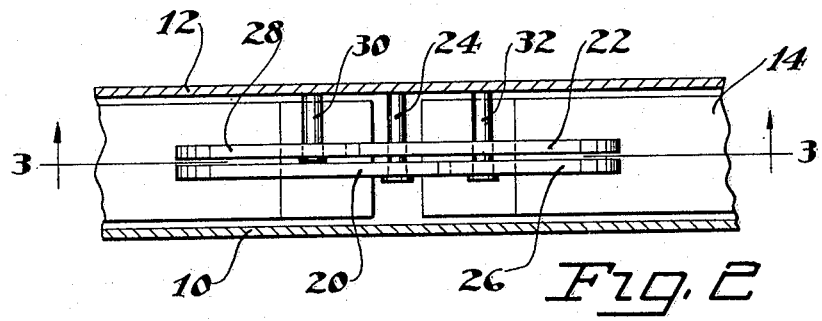
Figure 2 is a partial section on the line 2—2 of Figure 1 showing the novel brake anchorage in top plan.

The illustrated brake includes a rotatable drum 10 at the open side of which is a suitable support such as a backing plate 12 and within which is arranged the friction means of the brake, shown for purposes of illustration as a flexible expansible band 14 faced with the usual brake lining and operated by means such as a hydraulic cylinder and pair of pistons 16 against the resistance of the usual return spring 18.

Figure 3:
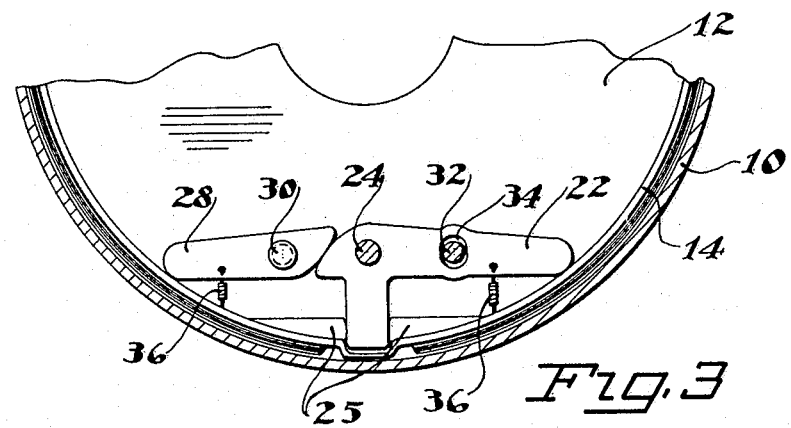
Figure 3 is a partial section on the line 3—3 of Figure 2 and showing one of the leverage devices of the brake anchorage.

According to the present invention, the torque of the friction means 14 is taken by a novel anchorage illustrated as including a pair of oppositely arranged similar bellcrank levers 20 and 22 arranged one behind the other and both fulcrumed on a fixed post 24 carried by the backing plate. The downwardly extending arms of the levers 20 and 22 are embraced by brackets 25 on the band 14 so that the torque of the band when the brake is applied is transmitted to these downwardly extending arms and thence to the anchor post 24. The other arms of the bell crank levers engage the inner face of the band 14, the end of lever 20 engaging it to the left of the anchor post 24 in Figures 1 and 3 and the end of the lever 22 engaging it to the right of the anchor post 24.

It will be seen that when the drum is turning clockwise in Figure 1 the bell crank lever 20 is relatively ineffective as an anchorage while the bell crank lever 22 forms the effective brake anchor and rocks about the anchor post 24 to urge the right hand portion of the band 14 radially outward against the drum. This radial movement of the band is permitted by the sliding engagement of the brackets 25 with the lower portions of the levers 20 and 22. If the drum is turning counter-clockwise, the lever 22 is comparatively ineffective as an anchorage and the lever 20 is operated to transmit the torque of the brake to the post 24 and also to shift the lefthand portion of the band radially outward against the drum.

In order also to shift against the drum the portion of the friction device 14 opposite the end of lever 22 or 20, whichever one is effective, I provide a pair of auxiliary levers 26 and 28 operatively engaged respectively by the bell crank levers 20 and 22 and fulcrumed respectively on a post 30 mounted on the backing plate and a post 32 also mounted on the backing plate and passing through a relatively large opening 34 in the bell crank lever 22 so that it does not interfere with the movement of the bell crank lever 22. Return springs 36 are preferably tensioned between the four levers 20, 22, 26 and 28 and the inner face of the band 14 and urge the entire lever system toward its released position.

It will be seen that when the lever 20 is effective as an anchorage and is urging the lefthand portion of the band radially outward, it will also operate the lever 26 to urge the righthand portion of the band radially outward; similarly, when the lever 22 is effective as an anchorage and is urging the righthand portion of the band outward, it operates lever 28 to urge the lefthand portion of the band outward. Thus, in either direction of drum rotation, the entire lower portion of the band 14 is urged with great force outward against the drum with a self-energizing effect to increase the braking power.

Figure 4:
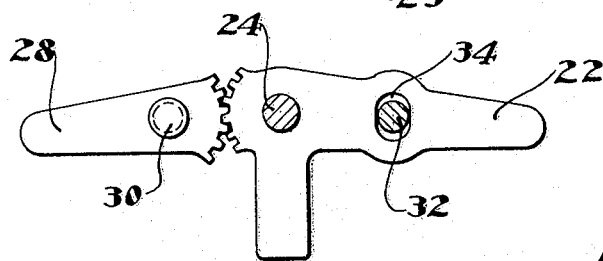
Figure 4 is a view corresponding to part of Figure 3, but showing a modified form of leverage device.

As shown in Figure 4, instead of the cam surfaces by which the levers engage, they may be connected by intermeshing rack teeth.

While one illustrative embodiment of the invention has been described in detail, it is not my intention to limit its scope to that particular embodiment or otherwise than by the terms of the appended claims.

I claim:

1. A brake comprising a rotatable drum and a friction device engageable with the drum, in combination with anchorage means for the friction device having a movable part engaged by the friction device and taking the torque thereof and which is shifted upon application of the brake to apply radial force to the friction device simultaneously at spaced points on opposite sides of the anchorage.

2. A brake comprising a rotatable drum and a friction device engageable with the drum, in combination with anchorage means for the friction device including a part which takes the torque from the friction device and which is shifted by said torque and spaced parts simultaneously operated by the shifting thereof to apply force in a radial direction against spaced portions of the friction device on opposite sides of the anchorage means.

3. A brake comprising a rotatable drum and a friction device engageable therewith, in combination with anchorage means taking the torque of the friction device and including two lever devices arranged side by side, one of which is operated by the torque of the brake when applied with the drum turning in one direction to force the friction device radially against the drum and the other of which is operated by the torque of the brake when the drum is turning in the other direction to force the friction device radially against the drum.

4. A brake anchorage comprising a fixed pivot, a bell crank lever mounted on said fixed pivot and having one arm adapted to serve as the anchor for a brake friction device and the other arm arranged to engage the friction device to urge it radially, in combination with another separately fulcrumed lever engaged and operated by the bell crank lever to force another portion of the friction device radially.

5. A brake comprising a drum and a friction device, in combination with an anchorage for the friction device including one lever forcing spaced portions of the friction device against the drum when the drum is turning in one direction and another lever forcing spaced portions of the friction device against the drum when the drum is turning in the other direction.

6. A brake comprising a drum and a friction device, in combination with an anchorage for the friction device including means forcing spaced portions of the friction device against the drum when the drum is turning in one direction and another means forcing the same spaced portions of the friction device against the drum when the drum is turning in the other direction.

7. A brake comprising a drum and a friction device, in combination with two devices arranged side by side and alternatively operable to force the friction device against the drum and each of which devices acts on circumferentially spaced portions of the friction device.

8. A brake comprising friction means, a pair of spaced pivots arranged adjacent the friction means, and two lever devices arranged side by side and fulcrumed on said pivots and acting on said means, each lever device comprising two inter-engaging parts fulcrumed respectively on said pivots.

9. A brake comprising friction means, a pair of spaced pivots arranged adjacent the friction means and serving as anchorage means to take the braking torque, and two lever devices arranged side by side and fulcrumed on said pivots and operated by the braking torque to intensify the application of the brake.

10. A brake comprising friction means, a pair of spaced pivots arranged adjacent the friction means, and two pairs of interconnected levers fulcrumed on said pivots, the pairs being arranged side by side thereon, one pair having an applying action on a plurality of parts of the friction means when the brake is operating in one direction, and the other pair having an applying action on a plurality of parts of the friction means when the brake is operating in the other direction.

11. A brake comprising friction means, a pair of spaced pivots arranged adjacent the friction means, and two pairs of interconnected levers fulcrumed on said pivots, the pairs being arranged side by side thereon and alternatively operable to have an applying action on a plurality of parts of the friction means.

12. A brake anchorage comprising two pairs of interconnected parts, each pair having an anchor portion engageable with friction means and each having a plurality of portions simultaneously given a brake-applying movement by thrust on its anchor portion.

13. A brake anchorage comprising two pairs of interconnected parts arranged side by side, each pair having an anchor portion and a plurality of brake-applying portions.

14. A brake device comprising a bell crank lever having a torque-receiving portion and an applying portion operated by thrust on the torque-receiving portion, and a separately-fulcrumed lever also having an applying portion and operatively engaged by the bell crank lever to be operated by thrust on said torque-receiving portion.

ALLEN C. CHAMBERS.